United States Patent
Tsuji et al.

(10) Patent No.: US 11,396,303 B2
(45) Date of Patent: Jul. 26, 2022

(54) VEHICLE CONTROL SYSTEM AND VEHICLE CONTROL METHOD

(71) Applicant: HONDA MOTOR CO., LTD., Tokyo (JP)

(72) Inventors: Kanta Tsuji, Wako (JP); Seiji Watanabe, Tokyo (JP); Akihiko Aoyagi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/555,563

(22) Filed: Dec. 20, 2021

(65) Prior Publication Data

US 2022/0204005 A1 Jun. 30, 2022

(30) Foreign Application Priority Data

Dec. 28, 2020 (JP) .............................. JP2020-218446

(51) Int. Cl.
*B60W 50/029* (2012.01)
*B60W 50/02* (2012.01)
(Continued)

(52) U.S. Cl.
CPC .......... *B60W 50/029* (2013.01); *B60W 10/18* (2013.01); *B60W 10/20* (2013.01);
(Continued)

(58) Field of Classification Search
CPC .. B60W 50/029; B60W 60/005; B60W 10/18; B60W 10/20; B60W 30/143;
(Continued)

(56) References Cited

U.S. PATENT DOCUMENTS

| 11,267,480 B2 * | 3/2022 | Tamagaki | B60W 40/09 |
| 2017/0079195 A1 * | 3/2017 | Yokoyama | A01B 69/00 |

(Continued)

FOREIGN PATENT DOCUMENTS

| DE | 112018007201 T5 * | 11/2020 | ........ B60W 50/0205 |
| DE | 112019001312 T5 * | 12/2020 | ............ B60T 13/662 |

(Continued)

OTHER PUBLICATIONS

Li et al., "The optimum cooperative controller of the steering/anti-lock braking system of the vehicle using the coordination model," 2011, Publisher: IEEE.*

(Continued)

*Primary Examiner* — Tuan C To
(74) *Attorney, Agent, or Firm* — Amin, Turocy & Watson, LLP

(57) ABSTRACT

In a case where a first control device performs traveling control, an abnormality occurs in a first control target, and an abnormality further occurs in a first control target or a second control target, a vehicle control system executes the following processes: (A) in a case where no abnormality occurs in a first control target required for the traveling control, the first control device continues the traveling control; (B) in a case where an abnormality occurs in the first control target required for the traveling control and no abnormality occurs in the second control target required for the traveling control, the second control device executes the traveling control; and (C) in a case where an abnormality occurs in the first control target required for the traveling control and an abnormality occurs in the second control target required for the traveling control, the traveling control is limited.

9 Claims, 7 Drawing Sheets

(51) Int. Cl.
   *B60W 50/14*       (2020.01)
   *B60W 60/00*       (2020.01)
   *B60W 30/14*       (2006.01)
   *B60W 10/20*       (2006.01)
   *G06V 20/56*       (2022.01)
   *B60W 10/18*       (2012.01)
   *B60W 50/00*       (2006.01)

(52) U.S. Cl.
   CPC ...... *B60W 30/143* (2013.01); *B60W 50/0205* (2013.01); *B60W 50/14* (2013.01); *B60W 60/005* (2020.02); *G06V 20/56* (2022.01); *B60W 2050/007* (2013.01); *B60W 2050/146* (2013.01); *B60W 2710/18* (2013.01); *B60W 2710/202* (2013.01); *B60W 2720/30* (2013.01)

(58) Field of Classification Search
   CPC ............ B60W 50/0205; B60W 50/14; B60W 2050/007; B60W 2050/146; B60W 2710/18; B60W 2710/202; B60W 2720/30; G06V 20/56
   USPC ....................................................... 701/29.2
   See application file for complete search history.

(56) References Cited

U.S. PATENT DOCUMENTS

| | | | | |
|---|---|---|---|---|
| 2018/0162390 | A1* | 6/2018 | Miura | B62D 6/00 |
| 2018/0194364 | A1* | 7/2018 | Asakura | G05D 1/0061 |
| 2020/0283010 | A1* | 9/2020 | Miyake | G06V 20/20 |
| 2020/0319644 | A1* | 10/2020 | Li | G05D 1/021 |
| 2020/0361478 | A1* | 11/2020 | Sakamoto | B60W 50/0225 |
| 2020/0391765 | A1* | 12/2020 | Jia | B60W 60/001 |
| 2021/0086772 | A1* | 3/2021 | Matsuura | B60W 50/087 |
| 2021/0094567 | A1* | 4/2021 | Imai | B60W 60/001 |
| 2021/0146953 | A1* | 5/2021 | Horita | G08G 1/167 |

FOREIGN PATENT DOCUMENTS

| | | | | |
|---|---|---|---|---|
| JP | 2003-015741 | | 1/2003 | |
| JP | 2003-226209 | | 8/2003 | |
| JP | 2012-011824 | | 1/2012 | |
| JP | 2017-013669 | | 1/2017 | |
| JP | 2019-023002 | | 2/2019 | |
| JP | 2020-015482 | | 1/2020 | |
| JP | 2020164038 A | * | 10/2020 | ............ B60W 30/06 |
| JP | 2020164075 A | * | 10/2020 | ............ B60W 10/04 |
| JP | 6792608 B2 | * | 11/2020 | .......... B60W 30/025 |
| WO | 2018/220811 | | 12/2018 | |
| WO | 2019/049267 | | 3/2019 | |
| WO | 2019/116459 | | 6/2019 | |

OTHER PUBLICATIONS

"Guo et al., ""The Cooperative Controller of the Steering System and Anti-lock Braking System of the Vehicle,"" 2010, vol. 5, Publisher: IEEE."*

Karsten et al., "Electronic Failures and Monitoring Strategies in Automotive Control Units," 2007, Publisher: IEEE.*

Japanese Office Action for Japanese Patent Application No. 2020-218446 dated Jun. 8, 2021.

Japanese Decision to Grant a Patent for Japanese Patent Application No. 2020-218446 dated Jul. 28, 2021.

* cited by examiner

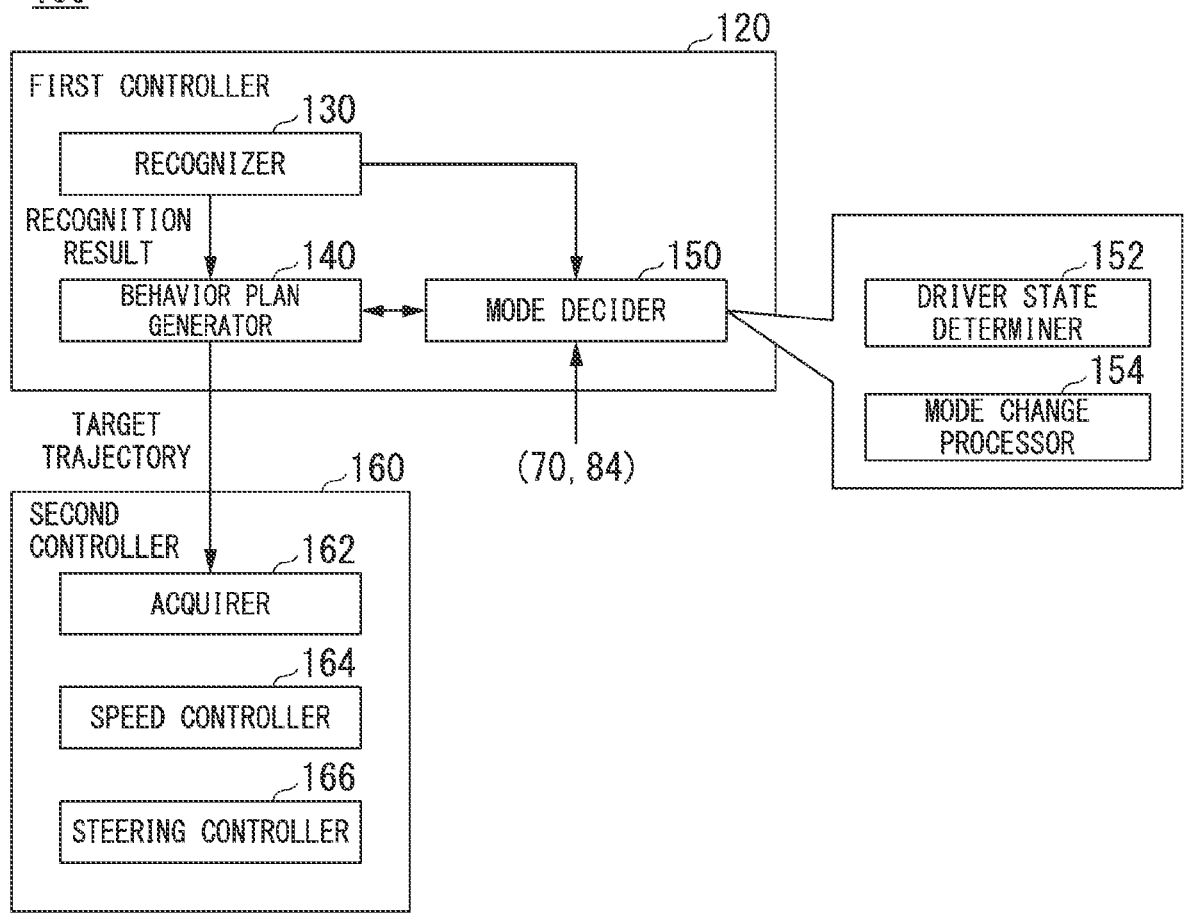

FIG. 5

| FIRST GROUP ||||
|---|---|---|---|
| FUNCTIONAL CONFIGURATION | TARGET |||
| TRANSMIT | FIRST NOTIFICATION ECU(264) | EXTERNAL NOTIFICATION ECU(266) | |
| KNOW | CAMERA (10) | LIDAR (14) | FIRST RECOGNITION DEVICE(16) |
| TURN | STEERING ECU (250) | | |
| STOP | BRAKING ECU (260) | | |
| HOLD | STOP HOLDING ECU (262) | | |

FIG. 6

| SECOND GROUP ||||
|---|---|---|---|
| FUNCTIONAL CONFIGURATION | TARGET |||
| TRANSMIT | SECOND NOTIFICATION ECU(366) | | |
| KNOW | CAMERA (310) | RADAR DEVICE (312) | SECOND RECOGNIZER (330) |
| TURN | STEERING ECU (350) | | |
| STOP | BRAKING ECU (362) | | |
| HOLD | STOP MAINTENANCE ECU(366) | | |

FIG. 9

| NUMBER | TARGET 1 | TARGET 2 |
|---|---|---|
| (1) | HUD (280) ① | DRIVING ECU (252) ① |
| (2) | BRAKING ECU (260) ① | STEERING ECU (250) ① |
| (3) | BRAKING ECU (260) ① | STOP HOLDING ECU (364) ② |
|     | BRAKING ECU (260) ① | STEERING ECU (350) ② |
| (4) | STOP HOLDING ECU (364) ② | STEERING ECU (250) ① |
|     | RADAR DEVICE (312) ② | STEERING ECU (250) ① |
| (5) | FIRST RECOGNITION DEVICE (16) ① | STEERING ECU (250) ① |
| (6) | STOP HOLDING ECU (364) ② | STOP HOLDING ECU (262) ① |
|     | FIRST RECOGNITION DEVICE (16) ① | RADAR DEVICE (312) ② |

① DEVICE HAVING FUNCTIONAL CONFIGURATION INCLUDED IN A FIRST GROUP
② DEVICE HAVING FUNCTIONAL CONFIGURATION INCLUDED IN A SECOND GROUP

VEHICLE CONTROL SYSTEM AND VEHICLE CONTROL METHOD

CROSS-REFERENCE TO RELATED APPLICATION

Priority is claimed on Japanese Patent Application No. 2020-218446, file Dec. 28, 2020, the content of which is incorporated herein by reference.

BACKGROUND

Field of the Invention

The present invention relates to a vehicle control system and a vehicle control method.

Description of Related Art

In the past, a control system of a vehicle that has an outside recognition device group and an actuator group, and includes a first communication means for a first traveling control means for performing first traveling control of the vehicle to communicate with the outside recognition device group, a second communication means for the first traveling control means to communicate with the actuator group, a third communication means for a second traveling control means for performing second traveling control of the vehicle to communicate with the outside recognition device group, and a fourth communication means for the second traveling control means to communicate with the actuator group has been disclosed (International Publication No. WO2019/116459). In this control system, in a case where a decline in the function of the vehicle is detected on the basis of the communication statuses of the first communication means, the second communication means, the third communication means, and the fourth communication means, at least one of the first traveling control means and the second traveling control means performs alternative control.

SUMMARY

However, in the above system, it may not be possible to sufficiently realize appropriate control according to the state of a vehicle.

The present invention was contrived in view of such circumstances, and one object thereof is to provide a vehicle control system and a vehicle control method that makes it possible to more appropriately control a vehicle in accordance with the state of the vehicle.

The following configurations are adopted in a vehicle control system and a vehicle control method according to this invention.

(1) According to an aspect of this invention, there is provide a vehicle control system including: a first control device configured to control steering and acceleration or deceleration of a vehicle to execute traveling control of the vehicle; and a second control device configured to control steering and acceleration or deceleration of a vehicle to execute traveling control of the vehicle, wherein the first control device monitors the presence or absence of an abnormality in a second control target, the second control device monitors the presence or absence of an abnormality in a first control target, and in a case where the first control device performs the traveling control, an abnormality occurs in any of first control targets of the first control device, and an abnormality further occurs in a first control target different from the any of first control targets or any of second control targets of the second control device, the following processes are executed: (A) in a case where no abnormality occurs in a first control target required for the traveling control, the first control device continues the traveling control; (B) in a case where an abnormality occurs in the first control target required for the traveling control and no abnormality occurs in a second control target required for the traveling control among the second control targets to be controlled by the second control device, the second control device executes the traveling control on behalf of the first control device; and (C) in a case where an abnormality occurs in the first control target required for the traveling control and an abnormality occurs in the second control target required for the traveling control, the first control device and the second control device limit the traveling control.

(2) In the aspect of the above (1), the control target of the first control device is a device having a function of controlling a driving force for moving the vehicle, a function of notifying an occupant of the traveling control, a function of recognizing a vicinity of the vehicle, a function of controlling steering, a function of performing braking, and a function of holding a stopped state of the vehicle.

(3) In the aspect of the above (2), the first control target required for the traveling control is a device having a function of controlling steering and a function of performing braking, and the second control target required for the traveling control is a device having a function of controlling steering and a function of performing braking.

(4) In any aspect of the above (1) to (3), the traveling control in (A) or (B) is traveling control for decelerating and stopping the vehicle.

(5) In the aspect of the above (4), in the case of (C), the first control device and the second control device request an occupant of the vehicle to perform manual driving, and continue to output a driving alternation request notification for requesting the occupant to perform manual driving using an output device even in a case where the occupant does not respond to the request.

(6) In any aspect of the above (1) to (5), the first control device is not capable of instructing the second control target, and the second control device is not capable of instructing the first control target.

(7) In any aspect of the above (1) to (5), the first control device is capable of instructing some of the second control targets among the second control targets, and the second control device is capable of instructing some of the first control targets among the first control targets.

(8) According to another aspect of this invention, there is provided a vehicle control system including: a first control device configured to control steering and acceleration or deceleration of a vehicle to execute traveling control of the vehicle; and a second control device configured to control steering and acceleration or deceleration of a vehicle to execute traveling control of the vehicle, wherein the first control device monitors the presence or absence of an abnormality of a second control target, the second control device monitors the presence or absence of an abnormality of a first control target, (a) in a case where a first abnormality occurs in any of first control targets of the first control device when the first control device performs the traveling control, the following processes are executed: (b) in a case where a type of the first abnormality satisfies a first reference in the above (a), the first control device continues the traveling control; and (c) in a case where the type of the first abnormality does not satisfy the first reference in the above (a), the second control device executes the traveling control on behalf of the first control device, and in a case where a second abnormality further occurs in a first control target different from the first control target in which the first abnormality occurs in the above (b), the following processes are executed: in a case where a type of the second abnormality satisfies a second reference, the first control device continues the traveling control; and in a case where the type of the second abnormality does not satisfy the second reference, the second control device executes the traveling control on behalf of the first control device.

(9) According to an aspect of this invention, there is provided a vehicle control method performed in a vehicle control system including a first control device configured to control steering and acceleration or deceleration of a vehicle to execute traveling control of the vehicle and a second control device configured to control steering and acceleration or deceleration of a vehicle to execute traveling control of the vehicle, wherein the first control device monitors the presence or absence of an abnormality of a second control target, the second control device monitors the presence or absence of an abnormality of a first control target, and in a case where the first control device performs the traveling control, an abnormality occurs in any of first control targets of the first control device, and an abnormality further occurs in a first control target different from the any of first targets or any of second control targets of the second control device, the following processes are executed: (A) in a case where no abnormality occurs in a first control target required for the traveling control, the first control device continues the traveling control; (B) in a case where an abnormality occurs in the first control target required for the traveling control and no abnormality occurs in a second control target required for the traveling control among the second control targets to be controlled by the second control device, the second control device executes the traveling control on behalf of the first control device; and (C) in a case where an abnormality occurs in the first control target required for the traveling control and an abnormality occurs in the second control target required for the traveling control, the first control device and the second control device limit the traveling control.

According to (1) to (9), the vehicle control system can more appropriately control a vehicle in accordance with the state of the vehicle.

BRIEF DESCRIPTION OF THE DRAWINGS

FIG. 2 is a functional configuration diagram of a first controller and a second controller.

FIG. 3 is a diagram showing an example of a correspondence relation between a driving mode, a control state of a vehicle, and a task.

FIG. 5 is a diagram showing a functional configuration included in a first group and a target corresponding to the functional configuration.

FIG. 6 is a diagram showing a function included in a second group and a target corresponding to the functional configuration.

FIG. 9 is a second diagram showing processes of a flowchart and a target in which an abnormality has occurred.

DETAILED DESCRIPTION

Hereinafter, an embodiment of a vehicle control system and a vehicle control method of the present invention will be described with reference to the accompanying drawings.

[Overall Configuration]

Figure 1:
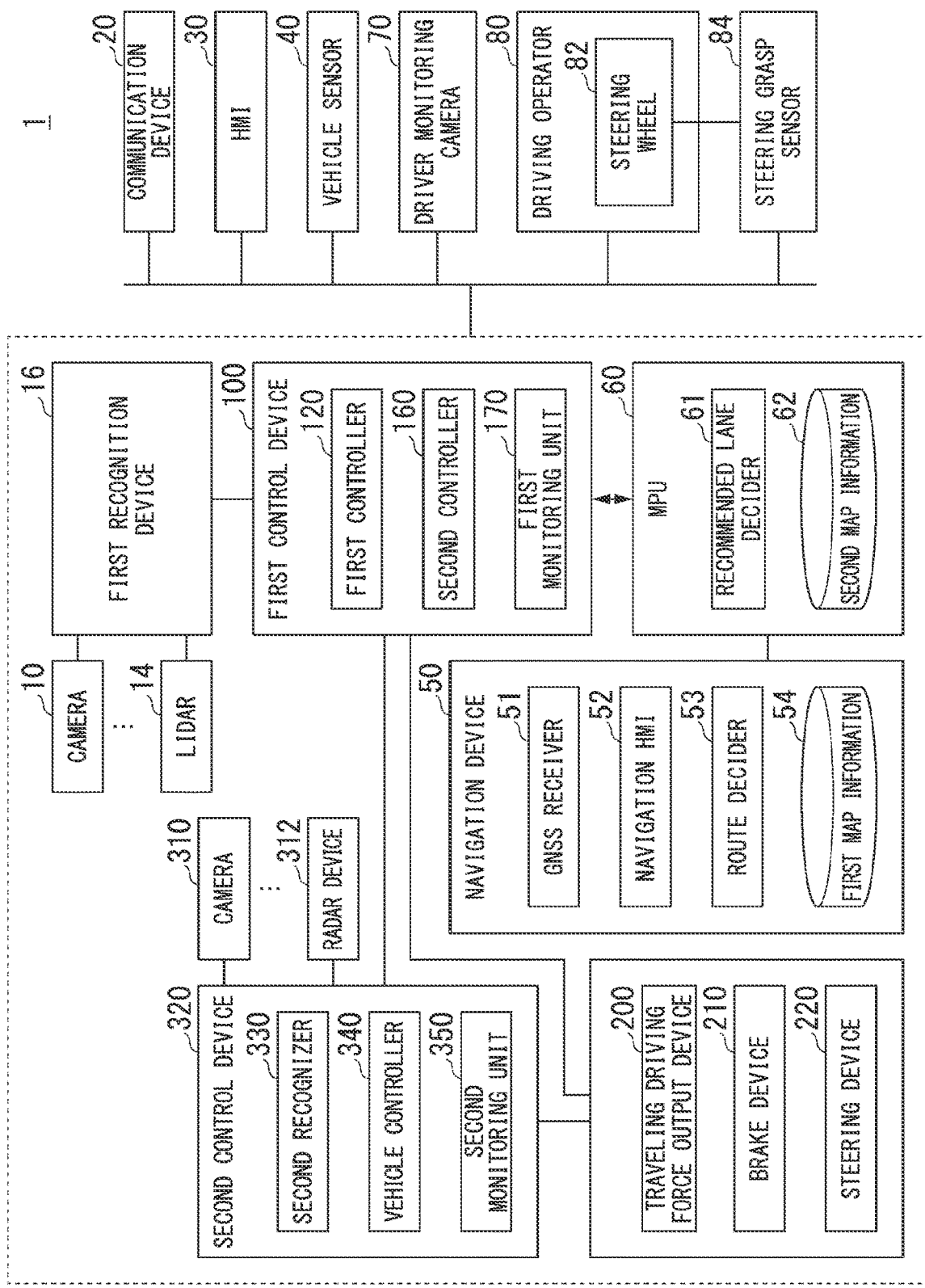
FIG. 1 is a configuration diagram of a vehicle system using a vehicle control device according to an embodiment.

FIG. 1 is a configuration diagram of a vehicle system 1 using a vehicle control device according to an embodiment. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell. In the following description, a vehicle is assumed to be a hybrid vehicle which is driven by a four-wheeled internal-combustion engine and an electric motor.

In the vehicle system 1, functions of controlling a vehicle are multiplexed or redundant in a first group and a second group which will be described later. This improves the reliability of the vehicle system 1.

The vehicle system 1 includes, for example, a camera 10, a light detection and ranging (LIDAR) 14, a first recognition device 16, a communication device 20, a human machine interface (HMI) 30, a vehicle sensor 40, a navigation device 50, a map positioning unit (MPU) 60, a driver monitoring camera 70, a driving operator 80, a first control device 100, a traveling driving force output device 200, a brake device 210, and a steering device 220.

The vehicle system 1 further includes, for example, a camera 310, a radar device 312, and a second control device 320.

These devices or instruments are connected to each other through a multiplex communication line such as a controller area network (CAN) communication line, a serial communication line, a wireless communication network, or the like. Configurations shown in FIG. 1 and FIGS. 2 and 4 to be described later are merely an example, and some portions of the configurations may be omitted, or other configurations may be further added. Connection modes of communication lines shown in FIG. 1 and FIGS. 2 and 4 to be described later are merely an example, and the connection modes may be changed as appropriate. Further, the functional configurations may be integrated or may be provided dispersedly. The vehicle system 1 is classified into a functional configuration included in a first group and a functional configuration included in a second group. The details of the first group and the second group will be described later (see FIG. 2).

The camera 10 is a digital camera using a solid-state imaging element such as, for example, a charge coupled device (CCD) or a complementary metal oxide semiconductor (CMOS). The camera 10 is installed at any points on a vehicle having the vehicle system 1 mounted therein (hereinafter referred to as a vehicle M). In a case where a forward image is captured, the camera 10 is installed on the upper portion of the front windshield, the rear surface of the rear-view mirror, or the like. The camera 10, for example, repeatedly captures an image of the vicinity of the vehicle M periodically. The camera 10 may be a stereo camera.

The LIDAR 14 irradiates the vicinity of the vehicle M with light (or electromagnetic waves having a wavelength close to that of the light), and measures scattered light. The LIDAR 14 detects a distance to an object on the basis of a time from light emission to light reception. The irradiation light is, for example, pulsed laser light. The LIDAR 14 is installed at any point on the vehicle M.

The first recognition device 16 recognizes the position, type, speed, or the like of an object by performing a sensor fusion process on the results of detection performed by some or all of the camera 10 and the LIDAR 14, and outputs the recognition results to the first control device 100. The first recognition device 16 may output the detection results of the camera 10 and the LIDAR 14, as they are, to the first control device 100. The first recognition device 16 may be omitted from the vehicle system 1. The first recognition device 16 may further perform the sensor fusion process using the detection results of the radar device 312.

The communication device 20 communicates with another vehicle which is present in the periphery of the vehicle M using, for example, a cellular network, a Wi-Fi network, Bluetooth (registered trademark), dedicated short range communication (DSRC), or the like, or communicates with various server devices through a wireless base station.

The HMI 30 presents various types of information to an occupant of the vehicle M, and receives the occupant's input operation. The HMI 30 includes various types of display devices, a speaker, a buzzer, a touch panel, a switch, a key, and the like. The HMI 30 may include a predetermined output device or a head up display (HUD) which is provided on a steering wheel to prompt an occupant to grasp the steering wheel.

The vehicle sensor 40 includes various sensors used for controlling the vehicle such as a vehicle speed sensor that detects the speed of the vehicle M, an acceleration sensor that detects an acceleration, a yaw rate sensor that detects an angular velocity around a vertical axis, an orientation sensor that detects the direction of the vehicle M, or the like.

The navigation device 50 includes, for example, a global navigation satellite system (GNSS) receiver 51, a navigation HMI 52, and a route decider 53. The navigation device 50 holds first map information 54 in a storage device such as a hard disk drive (HDD) or a flash memory. The GNSS receiver 51 specifies the position of the vehicle M on the basis of a signal received from a GNSS satellite. The position of the vehicle M may be specified or complemented by an inertial navigation system (INS) in which an output of the vehicle sensor 40 is used. The navigation HMI 52 includes a display device, a speaker, a touch panel, a key, or the like. The navigation HMI 52 may be partly or wholly shared with the above-described HMI 30. The route decider 53 decides, for example, a route (hereinafter, a route on a map) from the position (or any input position) of the vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane decider 61, and holds second map information 62 in a storage device such as an HDD or a flash memory. The recommended lane decider 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decider 61 makes a decision on which lane from the left to travel in. In a case where a branch point is present in the route on a map, the recommended lane decider 61 decides a recommended lane so that the vehicle M can travel along a rational route for advancing to a branch destination. The MPU 60 recognizes position of the vehicle M on the basis of the detection results of a gyro sensor (not shown), the position of the vehicle M specified by the GNSS receiver 51, or the like.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device. The second map information 62 stores information indicating the position or range of a zebra zone (channeling zone). The zebra zone is a road sign for guiding the traveling of a vehicle. The zebra zone is, for example, a sign represented by a striped pattern.

The driver monitoring camera 70 is a digital camera using a solid-state imaging element such as, for example, a CCD or a CMOS. The driver monitoring camera 70 is installed at any point in the vehicle M at a position and direction in which the head of an occupant who sits on a driver's seat of the vehicle M (hereinafter referred to as a driver) can be imaged from the front (in a direction in which his/her face is imaged). For example, the driver monitoring camera 70 is installed on the upper portion of a display device provided in the central portion of the instrument panel of the vehicle M.

The driving operator 80 includes, for example, an accelerator pedal, a brake pedal, a shift lever, and other operators in addition to a steering wheel 82. A sensor that detects the amount of operation or the presence or absence of operation is installed on the driving operator 80, and the detection results are output to the first control device 100, the second control device 320, or some or all of the traveling driving force output device 200, the brake device 210, and the steering device 220. A steering grasp sensor 84 is installed on the steering wheel 82. The steering grasp sensor 84 is realized by a capacitance sensor or the like, and outputs a signal that makes it possible to detect whether a driver is grasping the steering wheel 82 (which means that the driver is in contact with the steering wheel while applying force) to the first control device 100 or the second control device 320.

The first control device 100 includes, for example, a first controller 120, a second controller 160, and a first monitoring unit 170. The first controller 120 and the second controller 160 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in an HDD of the first control device 100 or a device such as a flash memory (a storage device including a non-transitory storage medium) in advance, may be stored in a detachable storage medium such as a DVD or a CD-ROM, or may be installed in the HDD of the first control device 100 or the flash memory by the storage medium (non-transitory storage medium) being mounted in a drive device.

FIG. 2 is a functional configuration diagram of the first controller 120 and the second controller 160. The first controller 120 includes, for example, a recognizer 130, a behavior plan generator 140, and a mode decider 150. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving (traveling control) is secured.

The recognizer 130 recognizes the state of the position, speed, acceleration, and the like of an object near the vehicle M on the basis of information which is input from the camera 10 and the LIDAR 14 through the first recognition device 16. The position of the object is recognized as, for example, a position in absolute coordinates with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes, for example, a lane (traveling lane) along which the vehicle M travels. For example, the recognizer 130 may recognize a traveling lane by comparing a pattern of a road partition line (for example, an array of solid lines and broken lines) obtained from the second map information 62 with a pattern of a road partition line located in the vicinity of the vehicle M which is recognized from an image captured by the camera 10. The recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the vehicle M acquired from the navigation device 50 or processing results based on an INS may be added. The recognizer 130 recognizes a stop line, an obstacle, a red light, a tollbooth, and other road events.

Upon recognizing a traveling lane, the recognizer 130 recognizes the position or posture of the vehicle M with respect to the traveling lane. The recognizer 130 may recognize, for example, deviation of the vehicle M from the center of the lane which is a reference point, and an angle formed with respect to a line aligned with the center of the lane of the vehicle M in its traveling direction, as the relative position and posture of the vehicle M with respect to the traveling lane. Instead, the recognizer 130 may recognize the position of the reference point of the vehicle M or the like with respect to either lateral end portion (a road partition line or a road boundary) of the traveling lane, as the relative position of the vehicle M with respect to the traveling lane.

The behavior plan generator 140 generates a target trajectory along which the vehicle M will travel in the future automatically (irrespective of a driver's operation) so that the vehicle M travels in the recommended lane decided by the recommended lane decider 61 in principle and can cope with the peripheral situation of the vehicle. The target trajectory includes, for example, a speed element. For example, the target trajectory may be represented as a trajectory obtained by arranging points (trajectory points) at which the vehicle M will arrive in order. The trajectory points are points at which the vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the vehicle M will arrive at sampling times for respective predetermined sampling times. In this case, information of a target speed or target acceleration is represented by an interval between trajectory points.

The behavior plan generator 140 may set automated driving events when generating a target trajectory. Examples of automated driving events include a constant-speed traveling event, a low-speed following traveling event, a lane change event, a diverging event, a merging event, an overtaking event, and the like. The behavior plan generator 140 generates a target trajectory according to a started event.

The mode decider 150 decides the driving mode of the vehicle M to be one of a plurality of driving modes in which a task imposed on the driver is different. The mode decider 150 includes, for example, a driver state determiner 152 and a mode change processor 154. These individual functions will be described later.

FIG. 3 is a diagram showing an example of a correspondence relation between a driving mode, a control state of the vehicle M, and a task. The driving mode of the vehicle M includes, for example, five modes from a mode A to a mode E. The degree of automation of the control state, that is, the driving control of the vehicle M, is highest in the mode A, then in the order of the mode B, the mode C, and the mode D, and is lowest in the mode E. On the other hand, a task imposed on the driver is lightest in the mode A, then in the order of the mode B, the mode C, and the mode D, and is heaviest in the mode E. In the modes D and E, since the control state is not a state of automated driving, the first control device 100 is responsible for ending control related to automated driving and transitioning to driving assistance or manual driving. Hereinafter, an exemplary example of the content of each driving mode will be provided.

In the mode A, the state of automated driving is set, and neither forward monitoring nor grasping of the steering wheel 82 (steering grasping in the drawing) is imposed on the driver. However, even in the mode A, the driver is required to be in a position to quickly transition to manual driving in accordance with a request from the system centered on the first control device 100. The term "automated driving" as used herein means that both steering and acceleration or deceleration are controlled irrespective of the driver's operation. The front is a space in the traveling direction of the vehicle M which is visually recognized through the front windshield. The mode A is a driving mode that can be executed in a case where, for example, on a highway for the exclusive use of cars such as an expressway, the vehicle M is traveling at a predetermined speed (for example, approximately 50 [km/h]) or less and a condition such as the presence of a preceding vehicle that is a following target is satisfied, and is referred to as traffic jam pilot (TJP) in some cases. In a case where such a condition is not satisfied, the mode decider 150 changes the driving mode of the vehicle M to the mode B.

In the mode B, the state of driving assistance is set, and a task of monitoring the front of the vehicle M (hereinafter referred to as forward monitoring) is imposed on the driver, but a task of grasping the steering wheel 82 is not imposed. In the mode C, the state of driving assistance is set, and a task of forward monitoring and a task of grasping the steering wheel 82 are imposed on the driver. The mode D is a driving mode in which the driver's driving operation is required to some extent with respect to at least one of steering and acceleration or deceleration of the vehicle M. For example, in the mode D, driving assistance such as adaptive cruise control (ACC) or a lane keeping assist system (LKAS) is executed. In the mode E, both steering and acceleration or deceleration are in a state of manual driving that requires the driver's driving operation. In both the mode D and the mode E, a task of monitoring the front of the vehicle M is naturally imposed on the driver.

In a case where a task related to a decided driving mode (hereinafter referred to as a current driving mode) is not executed by the driver, the mode decider 150 changes the driving mode of the vehicle M to a driving mode in which a task is heavier.

For example, in the mode A, in a case where the driver is in a position where transition to manual driving cannot be performed in accordance with a request from the system (for example, in a case where the driver continues to look outside an allowable area or a case where a sign of difficulty in driving is detected), the mode decider 150 performs control such as prompting the driver to transition to manual driving using the HMI 30 or a predetermined output device that prompts an occupant to grasp the steering wheel, gradually stopping the vehicle M on the side of a road when the driver does not respond, and stopping automated driving. After the automated driving is stopped, the vehicle is in the state of the mode D or E, and the vehicle M can be started by the driver's manual operation. Hereinafter, the same applies to "stop automated driving." In a case where the driver is not monitoring the front in the mode B, the mode decider 150 performs control such as prompting the driver to perform forward monitoring using the HMI 30 or a predetermined output device, gradually stopping the vehicle M on the side of a road when the driver does not respond, and stopping the automated driving. In a case where the driver is not monitoring the front in the mode C or is not grasping the steering wheel 82 in the mode C, the mode decider 150 performs control such as prompting the driver to perform forward monitoring and/or grasp the steering wheel 82 using the HMI 30 or a predetermined output device, gradually stopping the vehicle M on the side of a road when the driver does not respond, and stopping the automated driving.

The driver state determiner 152 monitors the state of the driver for the above mode change, and determines whether the state of the driver is a state in accordance with a task. For example, the driver state determiner 152 analyzes an image captured by the driver monitoring camera 70 to perform a posture estimation process, and determines whether the driver is in a position where transition to manual driving cannot be performed in accordance with a request from the system. The driver state determiner 152 analyzes an image captured by the driver monitoring camera 70 to perform a line-of-sight estimation process, and determines whether the driver is monitoring the front.

The mode change processor 154 performs various processes for mode change. For example, the mode change processor 154 instructs the behavior plan generator 140 to generate a target trajectory for shoulder stop, gives an operation instruction to a driving assistance device (not shown), or controls the HMI 30 in order to prompt the driver to take action.

FIG. 2 will be described again. The second controller 160 controls the traveling driving force output device 200, the brake device 210, and the steering device 220 so that the vehicle M passes along the target trajectory generated by the behavior plan generator 140 according to scheduled times.

The second controller 160 includes, for example, an acquirer 162, a speed controller 164, and a steering controller 166. The acquirer 162 acquires information of a target trajectory (trajectory point) generated by the behavior plan generator 140, and stores the acquired information in a memory (not shown). The speed controller 164 controls the traveling driving force output device 200 through a driving ECU 252 to be described later on the basis of a speed element associated with the target trajectory stored in the memory, and controls the brake device 210 through a braking ECU (260 or 362). The steering controller 166 controls the steering device 220 through a steering ECU (250 or 350) in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the vehicle M and feedback control based on deviation from the target trajectory. The speed controller 164 may be integrated into the driving ECU 252 or the braking ECU. The steering controller 166 may be integrated into the steering ECU.

The first monitoring unit 170 monitors the state of the functional configuration included in the second group. The details of processing of the first monitoring unit 170 will be described later.

The traveling driving force output device 200 outputs a traveling driving force (torque) for a vehicle to travel to a driving wheel. The traveling driving force output device 200 is, for example, a combination of an internal-combustion engine, an electric motor, a transmission, and the like.

The brake device 210 includes, for example, a brake caliper, a cylinder that transfers hydraulic pressure to the brake caliper, and an electric motor that generates hydraulic pressure in the cylinder. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, an electric motor. The electric motor changes the direction of a turning wheel, for example, by causing a force to act on a rack and pinion mechanism.

The camera 310 is a digital camera using a solid-state imaging element such as, for example, a CCD or a CMOS. The camera 310 is installed at any point on the vehicle M.

The camera 310, for example, repeatedly captures an image of the vicinity of the vehicle M periodically. The camera 10 may be a stereo camera.

The radar device 312 radiates radio waves such as millimeter waves to the vicinity of the host vehicle M, and detects radio waves (reflected waves) reflected from an object to detect at least the position (distance to and orientation of) of the object. The radar device 312 is installed at any point on the vehicle M. The radar device 312 may detect the position and speed of an object with a frequency modulated continuous wave (FM-CW) system.

The second control device 320 includes, for example, a second recognizer 330, a vehicle controller 340, and a second monitoring unit 342. The second recognizer 330, the vehicle controller 340, and the second monitoring unit 342 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The program may be stored in an HDD of the second control device 320 or a device such as a flash memory (a storage device including a non-transitory storage medium) in advance, may be stored in a detachable storage medium such as a DVD or a CD-ROM, or may be installed in the HDD of the second control device 320 or the flash memory by the storage medium (non-transitory storage medium) being mounted in a drive device.

The second recognizer 330 recognizes the position, type, speed, or the like of an object by performing a sensor fusion process on the results of detection performed by some or all of the camera 310 and the radar device 312.

The vehicle controller 340 executes the same processing as the first controller 120 and the second controller 160 to execute automated driving of the vehicle M. However, the processing performance of the first controller 120 and the second controller 160 (the first control device 100) is higher than the processing performance of the vehicle controller 340 (the second control device 320). The processing performance of the first controller 120 and the second controller 160 is higher than the reliability of the vehicle controller 340. Therefore, automated driving based on the first controller 120 and the second controller 160 is smoother than automated driving based on the vehicle controller 340.

The second monitoring unit 342 monitors the state of the functional configuration included in the first group. The details of processing of the second monitoring unit 342 will be described later.

[First Group and Second Group]

Figure 4:
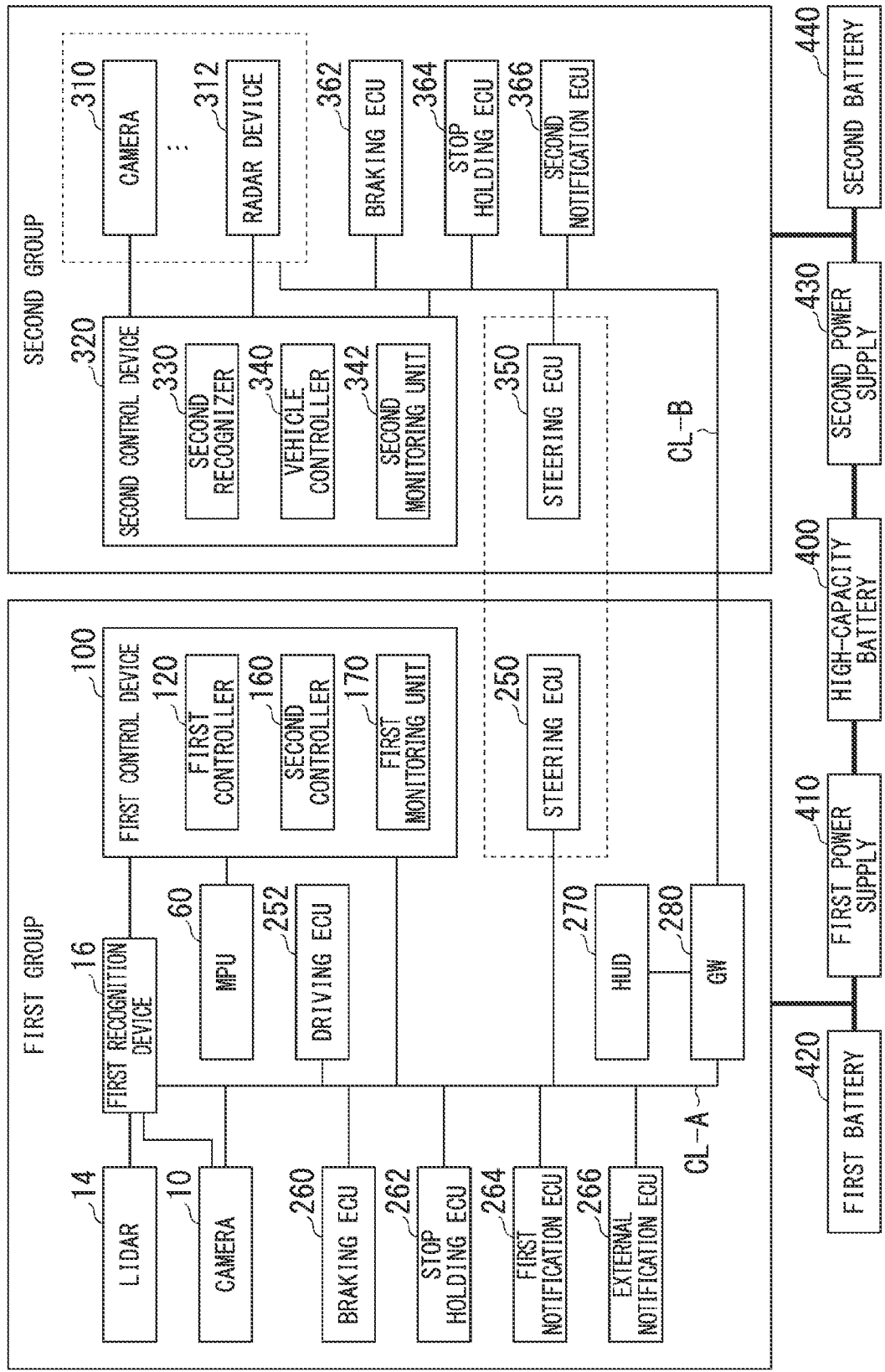
FIG. 4 is a diagram showing the vehicle system from another viewpoint.

FIG. 4 is a diagram showing the vehicle system 1 from another viewpoint. The first group and the second group will be described with reference to FIG. 4. The functional configurations described in FIGS. 1 and 2 will not be described.

(First Group)

The camera 10, the LIDAR 14, the first recognition device 16, the MPU 60, the first control device 100, the steering electronic control unit (ECU) 250, the driving ECU 252, the braking ECU 260, a stop holding ECU 262, a first notification ECU 264, an external notification ECU 266, an HUD 270, and a GW 280 are included in, for example, the first group. The device having the functional configuration included in the first group operates or cooperates with the first control device 100 when the automated driving is executed by control of the first control device 100. For example, each of the above ECU controls the control target of each ECU on the basis of the processing result of the first control device 100.

The steering ECU 250 controls the steering device 220 in cooperation with the first control device 100. The steering ECU 250 drives an electric motor in accordance with the information which is input from the second controller 160, and changes the direction of a turning wheel. The steering ECU 250 controls steering in accordance with the driver's operation of the steering wheel. The steering ECU 250 controls steering using information which is input from an electric motor that outputs a driving force for steering, a sensor that detects the amount of rotation of the electric motor, or a torque sensor that detects a steering torque, or provides the information to the second controller 160.

The driving ECU 252 controls the traveling driving force output device 200 in cooperation with the first control device 100. The driving ECU 252 controls the traveling driving force output device 200 in accordance with information which is input from a sensor provided in the driving operator 80. The driving ECU 252 controls, for example, an internal-combustion engine or an electric motor on the basis of the amount of operation of the accelerator pedal, the amount of operation of the brake pedal, or information which is input from a sensor that detects a vehicle speed, or switches the shift stage of the automatic transmission. The driving ECU 252 is an example of "a function of controlling a driving force for moving the vehicle M."

The braking ECU 260 controls the brake device 210 in cooperation with the first control device 100. The braking ECU 260 controls the electric motor in accordance with the information which is input from the second controller 160 so that a brake torque according to a braking operation is output to each wheel. The braking ECU 260 and the brake device 210 function as, for example, an electric servo brake (ESB). The braking ECU 260 controls, for example, the distribution of a braking force due to the brake device 210 and a braking force due to regenerative braking of the electric motor.

The stop holding ECU 262 controls an electric parking lock device provided in the automatic transmission. The electric parking lock device locks the internal mechanism of the automatic transmission, for example, in a case where a parking range (P range) is selected.

The first notification ECU 264 controls an in-vehicle output device that notifies of information in the vehicle. The in-vehicle output device includes, for example, an output device provided in the steering wheel. This output device turns on, for example, in a case where an occupant of the vehicle M needs to grasp the steering wheel. The in-vehicle output device also includes a mechanism that vibrates a seat belt and prompts the occupant to grasp the steering wheel or perform a predetermined operation.

The external notification ECU 266 controls an out-vehicle output device that notifies of information to the outside of the vehicle. The out-vehicle output device is, for example, a direction indicator. The external notification ECU 266 controls the direction indicator to notify of the traveling direction of the vehicle M to the outside of the vehicle or turn on an emergency blinking indicator lamp (hazard lamp).

The HUD 270 projects, for example, an image onto a portion of the front windshield in front of the driver's seat to thereby allow the eyes of the occupant who sits on the driver's seat to visually recognize a virtual image. The HUD, for example, allows the occupant to visually recognize information for assisting with driving. The information for assisting with driving is, for example, a vehicle speed or the direction to a destination. The HUD 270 is controlled by a control device (not shown) or the first control device 100.

The GW 280 relays a communication line CL-A and a communication line CL-B. For example, the camera 10, the first recognition device 16, the first control device 100, the driving ECU 252, the braking ECU 260, the stop holding ECU 262, the first notification ECU 264, and the external notification ECU 266 are connected to the communication line CL-A. For example, the camera 310, the radar device 312, the second control device 320, a braking ECU 362, a stop holding ECU 364, and a second notification ECU 366 are connected to the communication line CL-B. In this way, since the device having the functional configuration of the first group and the device having the functional configuration of the second group can communicate with each other through the GW 280, the first monitoring unit 170 can monitor the functional configuration included in the second group, and the second monitoring unit 342 can monitor the device having the functional configuration included in the first group.

(Second Group)

The camera 310, the LIDAR 312, the second control device 320, the steering ECU 350, the braking ECU 362, the stop holding ECU 364, and the second notification ECU 366 are included in, for example, the second group. The device having the functional configuration included in the second group operates or cooperates with a second control device 300 when the automated driving is executed by control of the second control device 320. For example, each of the above ECUs controls its own control target on the basis of the processing result of the second control device 300.

The steering ECU 350 controls the steering device 220 in cooperation with the second control device 300. The steering ECU 350 drives the electric motor in accordance with information which is input from the vehicle controller 340, and changes the direction of the turning wheel. The steering ECU 250 controls steering in accordance with the driver's operation of the steering wheel. The steering ECU 250 controls steering using information which is input from an electric motor that outputs a driving force for steering, a sensor that detects the amount of rotation of the electric motor, or a torque sensor that detects a steering torque.

The braking ECU 362 controls the brake device 210 in cooperation with the second control device 300. The braking ECU 362 controls the electric motor in accordance with the information which is input from the vehicle controller 340 so that a brake torque according to a braking operation is output to each wheel. The braking ECU 362 realizes vehicle stability assist (VSA). Based on the detection results of the yaw rate sensor or the acceleration sensor, the braking ECU 362 restrains the wheels from locking and sliding during sudden braking or when the brake is applied on a low friction road, restrains the wheels from idling during starting or stopping, or further restrains skidding from occurring by controlling the posture of the vehicle M during its turning.

The stop holding ECU 364 keeps the vehicle M stopped by controlling an electric parking brake (EPB). The electric parking brake has a mechanism that locks the rear wheels. The stop holding ECU 364 locks or unlocks the rear wheels by controlling the electric parking brake.

The second notification ECU 366 controls an instrument. The instrument is an instrument which is provided in front of the driver's seat to display various types of information such as vehicle speed, fuel consumption, and the like.

[First Monitoring Unit and Second Monitoring Unit]

The first monitoring unit 170 monitors the state of some or all of the functional configurations (devices having the functional configurations) included in the second group connected through the GW 280. The first monitoring unit 170 acquires, for example, information transmitted by a device which is a communication destination, and determines whether an abnormality is present in the device which is a communication destination on the basis of the acquired information. The presence of an abnormality is, for example, a state in which the second control device 320 cannot control the device which is a communication destination in an intended state. The presence of an abnormality includes, for example, a defect in the device, a defect in the function of the device, a decline in the function, a state in which communication with the device is different from a reference communication state, or the like. The information transmitted by the device which is a communication destination is a result of self-diagnosis of the device which is a connection destination or a predetermined flag transmitted from the device which is a connection destination. For example, in a case where information including a self-diagnosis result indicating an abnormality or a flag indicating an abnormality is transmitted from the device which is a connection destination, the first monitoring unit 170 determines that an abnormality is present in the device which is a communication destination. In the case in which communication with the device which is a connection destination is not possible or the communication is delayed, the first monitoring unit 170 may consider that there is an abnormality in the device which is a communication destination.

The second monitoring unit 342 monitors the state of some or all of the functional configurations included in the second group connected through the GW 280. The second monitoring unit 342 acquires information transmitted by a device which is a communication destination, and determines whether an abnormality is present in the device which is a communication destination on the basis of the acquired information. The presence of an abnormality is, for example, a state in which the first control device 100 cannot control the device which is a communication destination in an intended state. The presence of an abnormality includes, for example, a defect in the device, a defect in the function of the device, a decline in the function, a state in which communication with the device is different from a reference communication state, or the like. The abnormality of the device which is a communication destination includes, for example, a state similar to the state described in the description of the first monitoring unit 170.

[Power Supply]

The vehicle system 1 further includes, for example, a high-capacity battery 400, a first power supply 410, a first battery 420, a second power supply 430, and a second battery 440.

The high-capacity battery 400 is a rechargeable battery such as, for example, a lithium-ion battery. An electric motor for driving is driven by electric power supplied by the high-capacity battery 400. The high-capacity battery 400 is charged with regenerative electric power generated by the electric motor.

The first power supply 410 steps down the output voltage of the high-capacity battery 400 and supplies electric power of the high-capacity battery 400 to each functional configuration of the first group. The first battery 420 is, for example, a lead battery of 12 V. The electric power of the first battery 420 is supplied to the functional configuration of the first group, for example, in a case where electric power is not supplied from the high-capacity battery 400 to the functional configuration of the first group. The first battery 420 supplies electric power to some sensors included in the navigation device 50, the communication device 20, the driver monitoring camera 70, and the vehicle sensor 40.

The second power supply 430 steps down the output voltage of the high-capacity battery 400 and supplies electric power of the high-capacity battery 400 to each functional configuration of the second group. The second battery 440 is, for example, a lead battery of 12 V. The electric power of the second battery 440 is supplied to the functional configuration of the second group, for example, in a case where electric power is not supplied from the high-capacity battery 400 to the functional configuration of the second group. The second battery 440 supplies electric power to some sensors included in the steering grasp sensor 84 and the vehicle sensor 40.

FIG. 5 is a diagram showing the functional configuration included in the first group and a target corresponding to the functional configuration. The devices having the functional configurations included in the first group are classified into devices having five functional configurations. The five functional configurations are, for example, "transmit," "know," "turn," "stop," and "hold." "Transmit," "know," "turn," "stop" or "hold" may be referred to as elements.

The devices having the functional configuration of "transmit" are, for example, the first notification ECU 264 and the external notification ECU 266. The devices having the functional configuration of "know" are, for example, the camera 10, the LIDAR 14, and the first recognition device 16. The device having the functional configuration of "turn" is, for example, the steering ECU 250. The device having the functional configuration of "stop" is, for example, the braking ECU 260. The device having the functional configuration of "hold" is, for example, the stop maintenance ECU 262. In a case where an abnormality is present in the devices having the above functional configurations corresponding to elements, the first control device 100 cannot realize the elements (for example, "transmit," "know," "turn," "stop," or "hold" cannot be performed). For example, in a case where the steering ECU 250 is required to hold the rudder angle of steering (or the steering ECU 250 requests to hold the rudder angle of steering), but cannot hold the required rudder angle of steering, an abnormality is present in the steering ECU 250. In addition to the above, the device having the functional configuration included in the first group includes the function of "run." The device having the functional configuration of "run" is, for example, the driving ECU 252.

FIG. 6 is a diagram showing a function included in the second group and a target corresponding to the functional configuration. The devices having the functional configurations included in the second group are classified into devices having five functional configurations. The five functional configurations are, for example, "transmit," "know," "turn," "stop," and "hold."

The device having the functional configuration of "transmit" is, for example, the second notification ECU 366. The devices having the functional configuration of "know" are, for example, the camera 310, the radar device 312, and the second recognizer 330. The device having the functional configuration of "turn" is, for example, the steering ECU 350. The device having the functional configuration of "stop" is, for example, the braking ECU 362. The device having the functional configuration of "hold" is, for example, the stop maintenance ECU 366. In a case where an abnormality is present in the devices having the above functional configurations corresponding to elements, the second control device 300 cannot realize the element (for example, "transmit," "know," "turn," "stop," or "hold" cannot be performed). For example, in a case where the steering ECU 350 is required to hold the rudder angle of steering (or the steering ECU 350 requests to hold the rudder angle of steering), but cannot hold the required rudder angle of steering, an abnormality is present in the steering ECU 350.

As described above, the first control device 100 is not capable of instructing the device and the like included in the second group, and the second control device 320 is not capable of instructing the device and the like included in the first group. A device having all of the above functional configurations may be an example of a control target required for automated driving. A device having some (any combination) of the above functional configurations may be a control target required for automated driving. For example, the functional configurations of "turn" and "stop" may be control targets required for automated driving. The first control device 100 may be capable of instructing some of the devices and the like included in the second group, and the second control device 300 may be capable of instructing some of the devices and the like included in the first group.

The device having the functional configuration of each element in the first group or the second group described above may include an instrument or device to be controlled by each ECU, a device having a functional configuration for acquiring information relating to the state thereof (such as, for example, a sensor), and a device having a functional configuration for acquiring information used for control by each ECU (for example, a sensor).

In the above functional configurations, for example, in a case where the first control device 100 performs automated driving, an abnormality occurs in any of targets (first control targets) of the first control device 100, and an abnormality further occurs in a first control target different from the any of targets or any of second control targets of the second control device 320, the following processes are executed: (A) in a case where no abnormality occurs in a first control target required for the automated driving, the first control device 100 continues the automated driving; (B) in a case where an abnormality occurs in the first control target required for the automated driving and no abnormality occurs in a second control target required for the automated driving among the second control targets to be controlled by the second control device 320, the second control device 320 executes the automated driving on behalf of the first control device 100; and (C) in a case where an abnormality occurs in the first control target required for the automated driving and an abnormality occurs in the second control target required for the automated driving, the first control device 100 and the second control device 320 do not execute the automated driving or limit the automated driving. The wording "limit the automated driving" of (C) involves, for example, executing automated driving in which control is limited more than normal automated driving or the automated driving in the case of the above (B) (automated driving in which the degree of control is low), notifying an occupant of the vehicle M of a request for driving alternation, or continuing the request even in a case where the occupant does not respond to the request. Processing may be performed in accordance with the following flowchart.

[Flowchart]

Figure 7:
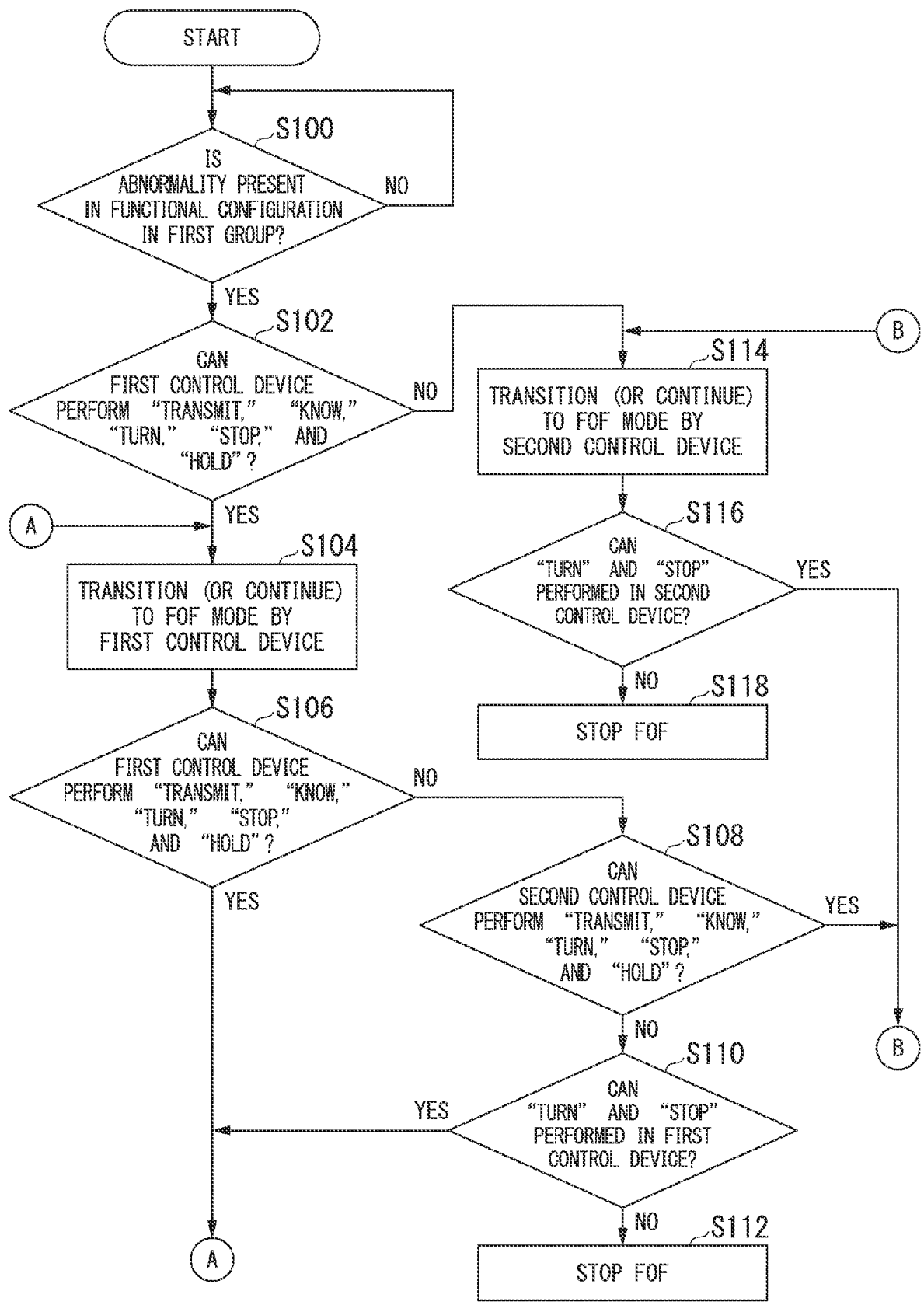
FIG. 7 is a flowchart showing an example of a flow of processes which are executed by the vehicle system.

FIG. 7 is a flowchart showing an example of a flow of processes which are executed by the vehicle system 1. First, the second control device 320 determines whether an abnormality is present in the functional configuration in the first group (step S100).

In a case where an abnormality is present, the second control device 320 determines whether the first control device 100 can perform "transmit," "know," "turn," "stop," and "hold" (step S102). In a case where the first control device 100 can perform "transmit," "know," "turn," "stop," and "hold," the first control device 100 controls the vehicle M in a fail operation function (FOF) mode (retraction control mode) (step S104).

The FOF mode is a mode in which the vehicle system 1 requests the driver to manually operate the vehicle M and controls the vehicle M so that it does not deviate from a road and does not excessively approach surrounding vehicles M. In a case where manual operation is not performed for a predetermined time, the vehicle system 1 decelerates the vehicle and stops the vehicle M as it is, or stops the vehicle M at a position where the vehicle can be stopped. The request for the driver to manually operate the vehicle M may be omitted.

Next, the second control device 320 determines whether the first control device 100 can perform "transmit," "know," "turn," "stop," and "hold" (step S106). In a case where the first control device 100 can perform "transmit," "know," "turn," "stop," and "hold," the process proceeds to step S104, and the first control device 100 continues to control the vehicle M in the FOF mode.

For example, in a case where an abnormality of a new functional configuration in the first group or the second group occurs between step S104 and step S106, but the first control device 100 can performs "transmit," "know," "turn," "stop," and "hold," the process proceeds to step S104, and the first control device 100 continues to control the vehicle M in the FOF mode. For example, even in a case where no abnormality of the new functional configuration occurs between step S104 and step S106, the processing result of step S106 is affirmative, and the process of step S104 continues.

In a case where the first control device 100 cannot perform "transmit," "know," "turn," "stop," and "hold" in step S106, it is determined whether the second control device 300 can perform "transmit," "know," "turn," "stop" and "hold" (step S108). In a case where the second control device 300 can perform "transmit," "know," "turn," "stop," and "hold," the process proceeds to step S114, and the second control device 300 controls the vehicle M in the FOF mode (step S114).

For example, in a case where an abnormality of the functional configuration in the first group or the second group occurs between step S104 and step S106, the first control device 100 cannot perform "transmit," "know," "turn," "stop," and "hold," and the second control device 320 can perform these elements, the process proceeds to step S114.

In a case where the second control device 320 cannot perform "transmit," "know," "turn," "stop," and "hold," the second control device 320 determines whether the first control device 100 can perform "turn" and "stop" (step S110). In a case where the first control device 100 can perform "turn" and "stop," the process proceeds to the process of step S104.

In a case where the first control device 100 cannot perform "turn" and "stop," the vehicle system 1 stops the FOF mode (step S112). In this case, the vehicle system 1 requests an occupant of the vehicle M to perform manual driving, and continues to output a driving alternation request notification for requesting the occupant to perform manual driving to an output device (such as, for example, the HMI 30, the HUD 270, or a predetermined output device that prompts grasping of the steering wheel) even in a case where the occupant does not respond to the request (automated driving is limited). In this case, for example, the vehicle system 1 may control the vehicle M by performing currently possible control. For example, the vehicle system 1 may decelerate the vehicle M or stop the vehicle M.

In a case where the first control device 100 cannot perform "transmit," "know," "turn," "stop," and "hold" in step S102, the second control device 300 controls the vehicle M in the FOF mode (step S114). Next, the first control device 100 determines whether the second control device 300 can perform "turn" and "stop" (step S116). In a case where the second control device 300 can perform "turn" and "stop," the process proceeds to the process of step S114. In a case where the second control device 300 cannot perform "turn" and "stop," the vehicle system 1 stops the FOF mode.

For example, in a case where an abnormality of a new functional configuration in the first group or the second group occurs between step S114 and step S116, but the second control device 320 can perform "turn" and "stop," the process proceeds to step S114, and the second control device 320 continues to control the vehicle M in the FOF mode. For example, even in a case where an abnormality of the new functional configuration does not occur between step S114 and step S116, the processing result of step S116 is affirmative, and thus the process of step S114 continues. This concludes the processing of the present flowchart.

Step S104 described above is an example of "(b)," step S114 described above is an example of "(c)," the affirmative determination in step S106 is an example of "the type of second abnormality satisfies a second reference," and the affirmative determination in step S108 is an example of "the type of second abnormality does not satisfy the second reference."

In the above example, in steps S102, S106, and S110, it is assumed that the second control device 320 determines whether the first control device 100 can perform "transmit," "know," "turn," "stop," or "hold," but the first control device 100 may perform this determination.

In the above example, in steps S108 and S116, it is assumed that the first control device 100 determines whether the second control device 300 can perform "transmit," "know," "turn," "stop," or "hold," but the second control device 300 may perform this determination.

In the above example, even in a case where the first control device 100 cannot realize a predetermined functional configuration of the first group due to a defect in the first control device 100, it is determined that an abnormality is present in a predetermined functional configuration (device having a functional configuration) in the first group, and it is determined that the predetermined functional configuration cannot be realized in each determination process. For example, a defect in the first control device 100 is a case where a signal to be received from a target device or the like cannot be acquired, a case where a signal to be transmitted to a target device or the like cannot be transmitted, a case where a delay or a defect occurs in the processing of the first control device 100, or the like. This idea is the same in the second control device 320.

In the above flowchart, in a case where the first control device 100 can perform "transmit," "know," "turn," "stop," or "hold," the first control device 100 controls the vehicle M in preference to the second control device 320. Since the first control device 100 has a functional configuration that makes it possible to perform processing with higher performance than the second control device 320, the vehicle M can be controlled more smoothly. For example, in a case where the first control device 100 cannot perform "transmit" or "know," and the second control device 320 can perform "transmit," "know," "turn," "stop," or "hold," the second control device 320 performs "transmit," "know," "turn," "stop," or "hold," giving priority to realizing each function rather than controlling the vehicle M. Thereby, the vehicle M can realize a functional configuration that cannot be realized by the first control device 100 using the second control device 320.

In a case where the determination in step S108 or step S116 of the above flowchart is an affirmative determination result, or a case where the determination in step S116 is a negative determination result, the second control device 320 may determine whether the first control device 100 can perform "turn" and "stop." In a case where the first control device 100 can perform "turn" and "stop," the first control device 100 may control the vehicle M in the FOF mode.

Specific Example

Figure 8:
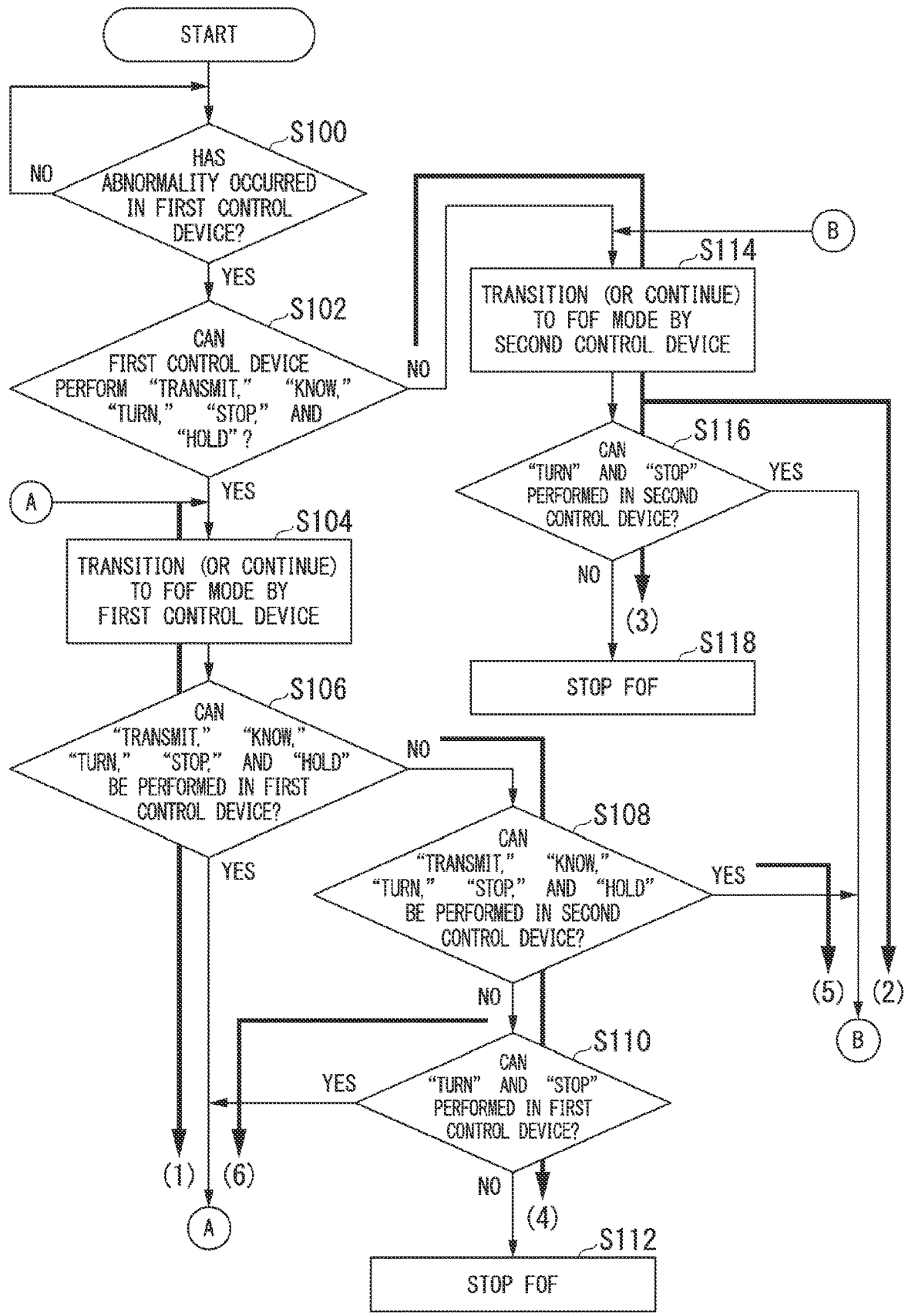
FIG. 8 is a first diagram showing processes of a flowchart and a target in which an abnormality has occurred.

FIGS. 8 and 9 are diagrams showing processes of a flowchart and a target in which an abnormality has occurred. FIGS. 8 and 9 show only an example. The determination reference may be changed as appropriate.

Path (1): In a case an abnormality occurs in the HUD 270 and an abnormality occurs in the driving ECU 252, the FOF mode is executed by the first control device 100 ("YES" in step S100→"YES" in step S102)→("YES" in step S106).

Path (2): In a case where an abnormality occurs in the braking ECU 260 and an abnormality occurs in the steering ECU 250, the FOF mode is executed by the second control device 300 ("YES" in step S100→"NO" in step S102→"YES" in step S116).

Path (3): In a case where an abnormality occurs in the braking ECU 260 and an abnormality occurs in the stop holding ECU 364, the FOF mode is stopped ("YES" in step S100→"NO" in step S102→"NO" in step S116). For example, in a case where the vehicle M is stopped in the FOF mode, the braking ECU 362 cannot hold the vehicle M over a long period of time. Therefore, the stop holding ECU 364 is a hold function, but in a case where an abnormality occurs in the stop holding ECU 364, the FOF mode is stopped on the assumption that "stop" cannot be performed. In a case where an abnormality occurs in the braking ECU 260 and an abnormality occurs in the steering ECU 350, the FOF mode is stopped.

Path (4): In a case where an abnormality occurs in the stop holding ECU 364 and an abnormality occurs in the steering ECU 250, the FOF mode is stopped ("YES" in step S100→"NO" in step S108→"NO" in step S110→step S112). In order to reduce the complexity of switching, in the examples of FIGS. 8 and 9, in a case where an abnormality occurs in one of the steering ECU 250 or the steering ECU 350, it is assumed that control for switching to the other steering ECU is not performed. In a case where an abnormality occurs in the radar device 312 and an abnormality occurs in the steering ECU 250, the FOF mode is stopped.

Path (5): In a case where an abnormality occurs in the first recognition device 16 and an abnormality occurs in the steering ECU 250, the FOF mode is executed by the second control device 300 ("YES" in step S100→"YES" in step S102→"NO" in step S106→"YES" in step S108). Even in a case where an abnormality occurs in the first recognition device 16, the first control device 100 can realize the function of "know" on the basis of, for example, an image captured by the camera 10, an image captured by the camera 10, information obtained from the radar device 312, and information recognized by the second recognizer 330. For example, in a case where the function of "know" can be complemented by other functions in the function of "know," it may be determined that the function of "know" can be realized in the first control device 100. In a case where an abnormality occurs in the first recognition device 16 as described above, switching to the other steering ECU the second control device 320 realizes the function of "know" performs control. In this way, the determination reference may be changed depending on the type of abnormality.

Path (6): In a case where an abnormality occurs in the stop holding ECU 364 and an abnormality occurs in the holding ECU 262, the FOF mode is executed by the first control device 100 ("YES" in step S100→"YES" in step S102→"NO" in step S106→"NO" in step S108→"YES" in step S110). In a case where an abnormality occurs in the first recognition device 16 and an abnormality occurs in the radar device 312, the FOF mode is executed by the first control device 100.

The above path (1) or (6) is an example of the path of "(A)," the above path (2) or (5) is an example of the path of "(B)," and the above path (3) or (4) is an example of the path of "(C)."

In a case where multiple defects occur as described above, the vehicle system 1 can stabilize the vehicle M by performing control according to the defects as described above. For example, in a case where a triple or quadruple configuration is used to cope with multiple failures, the system will be bloated.

As described above, the vehicle system 1 of the present embodiment can control the vehicle M more appropriately in accordance with the state of the vehicle M by the first control device 100 or the second control device 320 performing control depending on the types of multiple defects.

According to the embodiment described above, in a case where the first control device 100 performs traveling control, an abnormality occurs in any of targets (first control targets) of the first control device 100, and an abnormality further occurs in a first control target different from the any of first control targets or any of second control targets of the second control device 320, the following processes are executed: (A) in a case where no abnormality occurs in a first control target required for the traveling control, the first control device 100 continues the traveling control; (B) in a case where an abnormality occurs in the first control target required for the traveling control and no abnormality occurs in a second control target required for the traveling control among the second control targets to be controlled by the second control device 320, the second control device 320 executes the traveling control on behalf of the first control device 100; and (C) in a case where an abnormality occurs in the first control target required for the traveling control and an abnormality occurs in the second control target required for the traveling control, the first control device 100 and the second control device 320 controls the vehicle M more appropriately in accordance with the state of the vehicle M by not executing the traveling control.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a first control device configured to control steering and acceleration or deceleration of a vehicle to execute traveling control of the vehicle; and
a second control device configured to control steering and acceleration or deceleration of a vehicle to execute traveling control of the vehicle,
wherein the first control device monitors the presence or absence of an abnormality in a second control target of the second control device,
the second control device monitors the presence or absence of an abnormality in a first control target of the first control device, and
in a case where the first control device performs the traveling control, an abnormality occurs in any of first control targets of the first control device, and an abnormality further occurs in a first control target different from the any of first control targets or any of second control targets of the second control device, the following processes are executed:
(A) in a case where no abnormality occurs in a first control target required for the traveling control, the first control device continues the traveling control;
(B) in a case where an abnormality occurs in the first control target required for the traveling control and no abnormality occurs in a second control target required for the traveling control among the second control targets to be controlled by the second control device, the second control device executes the traveling control on behalf of the first control device; and
(C) in a case where an abnormality occurs in the first control target required for the traveling control and an abnormality occurs in the second control target required for the traveling control, the first control device and the second control device limit the traveling control.

2. The vehicle control system according to claim 1, wherein the control target of the first control device is a device having a function of controlling a driving force for moving the vehicle, a function of notifying an occupant of the traveling control, a function of recognizing a vicinity of the vehicle, a function of controlling steering, a function of performing braking, and a function of holding a stopped state of the vehicle.

3. The vehicle control system according to claim 2, wherein the first control target required for the traveling control is a device having a function of controlling steering and a function of performing braking, and
the second control target required for the traveling control is a device having a function of controlling steering and a function of performing braking.

4. The vehicle control system according to claim 1, wherein the traveling control in (A) or (B) is traveling control for decelerating and stopping the vehicle.

5. The vehicle control system according to claim 4, wherein, in the case of (C), the first control device and the second control device request an occupant of the vehicle to perform manual driving, and continue to output a driving alternation request notification for requesting the occupant to perform manual driving using an output device even in a case where the occupant does not respond to the request.

6. The vehicle control system according to claim 1, wherein the first control device is not capable of instructing the second control target, and
the second control device is not capable of instructing the first control target.

7. The vehicle control system according to claim 1, wherein the first control device is capable of instructing some of the second control targets among the second control targets, and
the second control device is capable of instructing some of the first control targets among the first control targets.

8. A vehicle control system comprising:
a first control device configured to control steering and acceleration or deceleration of a vehicle to execute traveling control of the vehicle; and
a second control device configured to control steering and acceleration or deceleration of a vehicle to execute traveling control of the vehicle,
wherein the first control device monitors the presence or absence of an abnormality of a second control target,
the second control device monitors the presence or absence of an abnormality of a first control target,
(a) in a case where a first abnormality occurs in any of first control targets of the first control device when the first control device performs the traveling control, the following processes are executed:
(b) in a case where a type of the first abnormality satisfies a first reference in the above (a), the first control device continues the traveling control; and
(c) in a case where the type of the first abnormality does not satisfy the first reference in the above (a), the second control device executes the traveling control on behalf of the first control device, and
in a case where a second abnormality further occurs in a first control target different from the first control target in which the first abnormality occurs in the above (b), the following processes are executed:
in a case where a type of the second abnormality satisfies a second reference, the first control device continues the traveling control; and
in a case where the type of the second abnormality does not satisfy the second reference, the second control device executes the traveling control on behalf of the first control device.

9. A vehicle control method performed in a vehicle control system including a first control device configured to control steering and acceleration or deceleration of a vehicle to execute traveling control of the vehicle and a second control device configured to control steering and acceleration or deceleration of a vehicle to execute traveling control of the vehicle,
wherein the first control device monitors the presence or absence of an abnormality of a second control target,
the second control device monitors the presence or absence of an abnormality of a first control target, and
in a case where the first control device performs the traveling control, an abnormality occurs in any of first control targets of the first control device, and an abnormality further occurs in a first control target different from the any of first control targets or any of second control targets of the second control device, the following processes are executed:
(A) in a case where no abnormality occurs in a first control target required for the traveling control, the first control device continues the traveling control;
(B) in a case where an abnormality occurs in the first control target required for the traveling control and no abnormality occurs in a second control target required for the traveling control among the second control targets to be controlled by the second control device, the second control device executes the traveling control on behalf of the first control device; and (C) in a case where an abnormality occurs in the first control target required for the traveling control and an abnormality occurs in the second control target required for the traveling control, the first control device and the second control device limit the traveling control.

* * * * *